(12) United States Patent
Winkler et al.

(10) Patent No.: US 8,293,197 B2
(45) Date of Patent: Oct. 23, 2012

(54) SYSTEMS AND METHODS FOR ENHANCED SELECTIVE CATALYTIC REDUCTION OF $NO_x$

(75) Inventors: Benjamin Hale Winkler, Albany, NY (US); Dan Hancu, Clifton Park, NY (US); Ashish Balkrishna Mhadeshwar, Storrs, CT (US)

(73) Assignee: General Electric Company, Niskayuna, NY (US)

( * ) Notice: Subject to any disclaimer, the term of this patent is extended or adjusted under 35 U.S.C. 154(b) by 74 days.

(21) Appl. No.: 12/915,840

(22) Filed: Oct. 29, 2010

(65) Prior Publication Data

US 2012/0107207 A1 May 3, 2012

(51) Int. Cl.
*B01D 53/56* (2006.01)
*B01D 53/86* (2006.01)
*B01D 53/90* (2006.01)
*B01D 53/94* (2006.01)
*F01N 3/10* (2006.01)

(52) U.S. Cl. ............... 423/213.2; 423/213.5; 423/213.7; 423/239.1; 422/105; 422/108; 422/168; 422/169; 422/170; 422/171; 422/172; 422/181; 60/295; 60/299; 60/301

(58) Field of Classification Search ............... 423/213.2, 423/213.5, 213.7, 239.1; 422/105, 108, 168–172, 422/181; 60/295, 299, 301
See application file for complete search history.

(56) References Cited

U.S. PATENT DOCUMENTS

| | | | |
|---|---|---|---|
| 6,314,722 B1 | 11/2001 | Matros et al. | |
| 7,146,802 B2 * | 12/2006 | Lee | 60/286 |
| 7,638,107 B1 | 12/2009 | Wirt et al. | |
| 2005/0137083 A1 * | 6/2005 | Rocha et al. | 502/323 |
| 2005/0284134 A1 | 12/2005 | Radhamohan et al. | |
| 2006/0133976 A1 * | 6/2006 | Male et al. | 423/239.1 |
| 2009/0255236 A1 * | 10/2009 | Collier et al. | 60/297 |
| 2010/0239478 A1 * | 9/2010 | Arnold et al. | 423/213.2 |

FOREIGN PATENT DOCUMENTS

| | | |
|---|---|---|
| EP | 2072774 A1 | 6/2009 |
| JP | 2003144854 A | 5/2003 |

OTHER PUBLICATIONS

Bjorn Westerberg et al; "Optimisation of a dosing strategy for an HC-SCR diesel exhaust after-treatment system"; vol. 87, Issue 2, Jun. 28, 2002, Abstract-1 Page.

* cited by examiner

*Primary Examiner* — Timothy Vanoy
(74) *Attorney, Agent, or Firm* — Paul J. DiConza

(57) ABSTRACT

A system for reducing nitrogen oxides from an exhaust fluid is provided. The system includes an exhaust source, a hydrocarbon reductant source, a first injector in fluid communication with the hydrocarbon reductant source, where the first injector receives a first hydrocarbon reductant stream from the hydrocarbon reductant source, and expels the first portion of the hydrocarbon reductant stream. The system further includes a first catalyst that receives the exhaust stream and the first hydrocarbon reductant stream, a second injector in fluid communication with the hydrocarbon reductant source, where the second injector receives a second hydrocarbon reductant stream from the hydrocarbon reductant source, and expels the second hydrocarbon reductant stream, and a second catalyst disposed to receive an effluent from the first catalyst and the second portion of the hydrocarbon reductant stream.

21 Claims, 2 Drawing Sheets

SYSTEMS AND METHODS FOR ENHANCED SELECTIVE CATALYTIC REDUCTION OF $NO_x$

BACKGROUND

Figure 1:
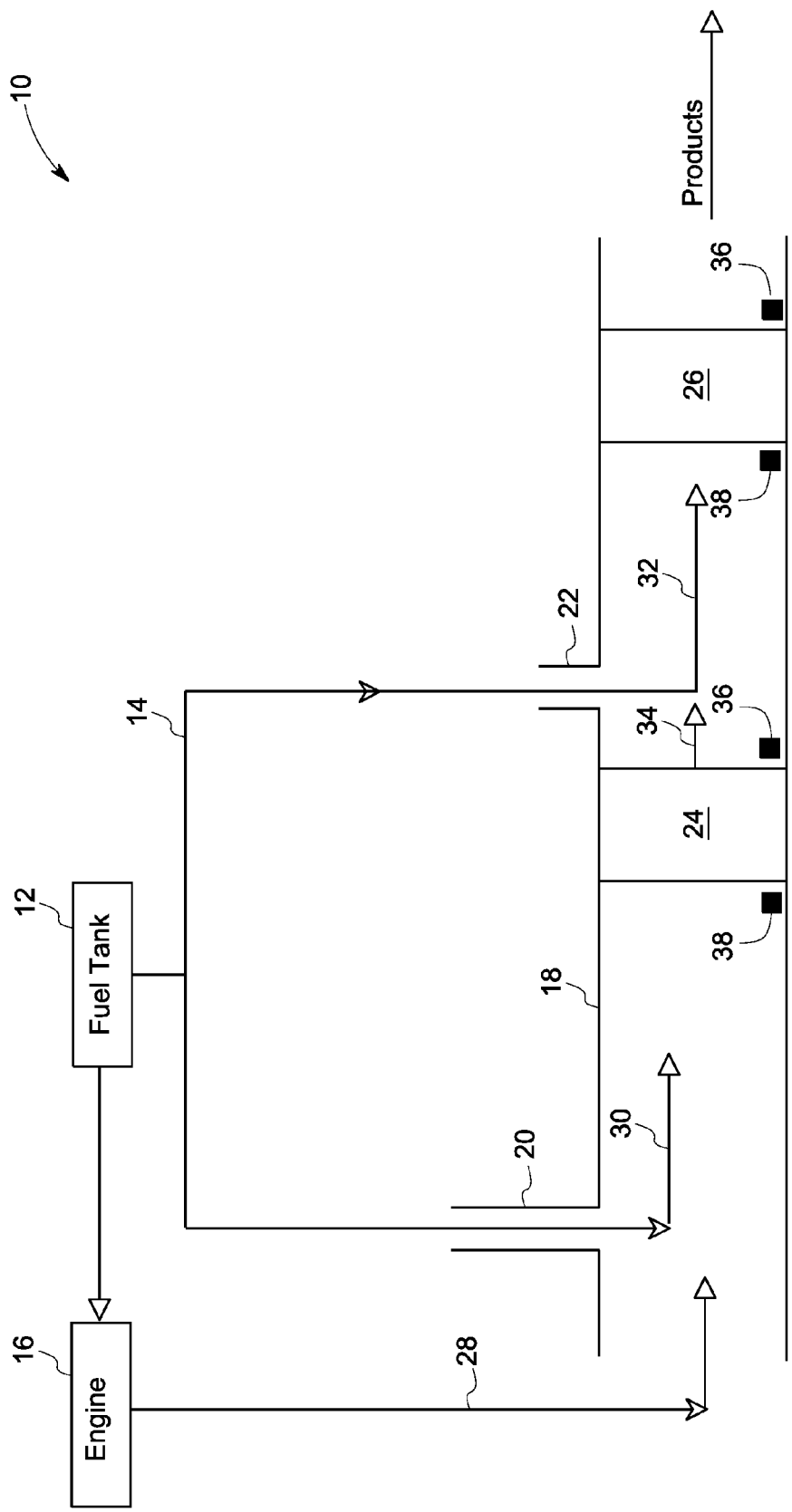

The invention relates generally to reduction of nitrogen oxides ($NO_x$), and particularly, to systems and methods for selective catalytic reduction (SCR) of $NO_x$.

Various methods are used to reduce deleterious effects of air pollution caused by byproducts of high-temperature combustion in internal combustion engines. When combustion occurs in the presence of excess air and at high temperatures, undesirable byproducts, such as nitrogen oxides, commonly known as $NO_x$, are created. $NO_x$ emissions are subject to many regulatory provisions limiting the amount of $NO_x$ that may be present in effluent gas vented into the surrounding environment.

One known method for dealing with $NO_x$ involves the use of selective catalytic reduction (SCR) to reduce $NO_x$ to nitrogen gas ($N_2$) using ammonia ($NH_3$) or hydrocarbons as a reductant. However, as ammonia's own hazardous consequences are well known, its use in an SCR system presents additional environmental and other problems that must also be addressed. For example, ammonia slip may result in environmental hazard. As regulatory agencies continue to drive limits on $NO_x$ emission lower, other regulations are also driving down the permissible levels of $NH_3$ that may be emitted into the atmosphere.

Because of regulatory limits on ammonia, the use of hydrocarbons and/or their oxygen derivatives for $NO_x$ reduction in an SCR process is very attractive. Numerous catalysts have been suggested for this purpose including zeolites, perovskites, and metals on metal oxide catalyst support. However, existing catalyst systems have characteristics, such as low activity, a narrow region of working temperatures, or low stability in the presence of water, that are detrimental to practical use. Other catalyst systems known to reduce $NO_x$ have exhibited very little control over the products formed from the reduction and in particular exhibit poor selectivity towards $N_2$ as product.

Therefore there is a need for an effective catalyst system to reduce $NO_x$ emissions, which system is stable and operable at a wide range of temperatures.

BRIEF DESCRIPTION

One embodiment of the present invention provides a system for reducing nitrogen oxides from an exhaust fluid. The system includes an exhaust source configured to produce an exhaust stream comprising nitrogen oxides, a hydrocarbon reductant source, a first injector in fluid communication with the hydrocarbon reductant source, wherein the first injector is positioned to receive a first hydrocarbon reductant stream from the hydrocarbon reductant source, and to expel the first portion of the hydrocarbon reductant stream. The system further includes a first catalyst disposed to receive the exhaust stream and further disposed to receive the first hydrocarbon reductant stream from the first injector, a second injector in fluid communication with the hydrocarbon reductant source, where the second injector is positioned to receive a second hydrocarbon reductant stream from the hydrocarbon reductant source, and to expel the second hydrocarbon reductant stream, and a second catalyst disposed to receive an effluent from the first catalyst and further disposed to receive the second portion of the hydrocarbon reductant stream from the second injector.

Another embodiment of the present invention provides a system for reducing nitrogen oxides from an exhaust stream. The system includes an exhaust source configured to produce an exhaust stream comprising nitrogen oxides, a hydrocarbon reductant source that provides a hydrocarbon reductant stream, a plurality of injectors that are in fluid communication with the hydrocarbon reductant source. One or more of the plurality of injectors are positioned to receive a corresponding portion of the hydrocarbon reductant stream from the hydrocarbon reductant source and to expel the corresponding portion of the hydrocarbon reductant stream. The system further includes a plurality of catalysts disposed to receive the corresponding portion of the hydrocarbon reductant stream, or the combinations of the exhaust stream and the corresponding portion of the hydrocarbon reductant stream.

Yet another embodiment of the present invention provides a method for reducing nitrogen oxides. The method includes providing an exhaust stream, providing a hydrocarbon reductant stream, injecting the exhaust stream and a first portion of the hydrocarbon reductant stream for expelling a combination of at least a portion of the exhaust stream and the first hydrocarbon reductant stream, selectively catalytically reducing at least a portion of nitrogen oxides present in the exhaust stream to form a first effluent, injecting a second hydrocarbon reductant stream, and selectively catalytically reducing at least a portion of nitrogen oxides present in the first effluent by using the second portion of the hydrocarbon reductant stream to form a second effluent.

DRAWINGS

Figure 2:
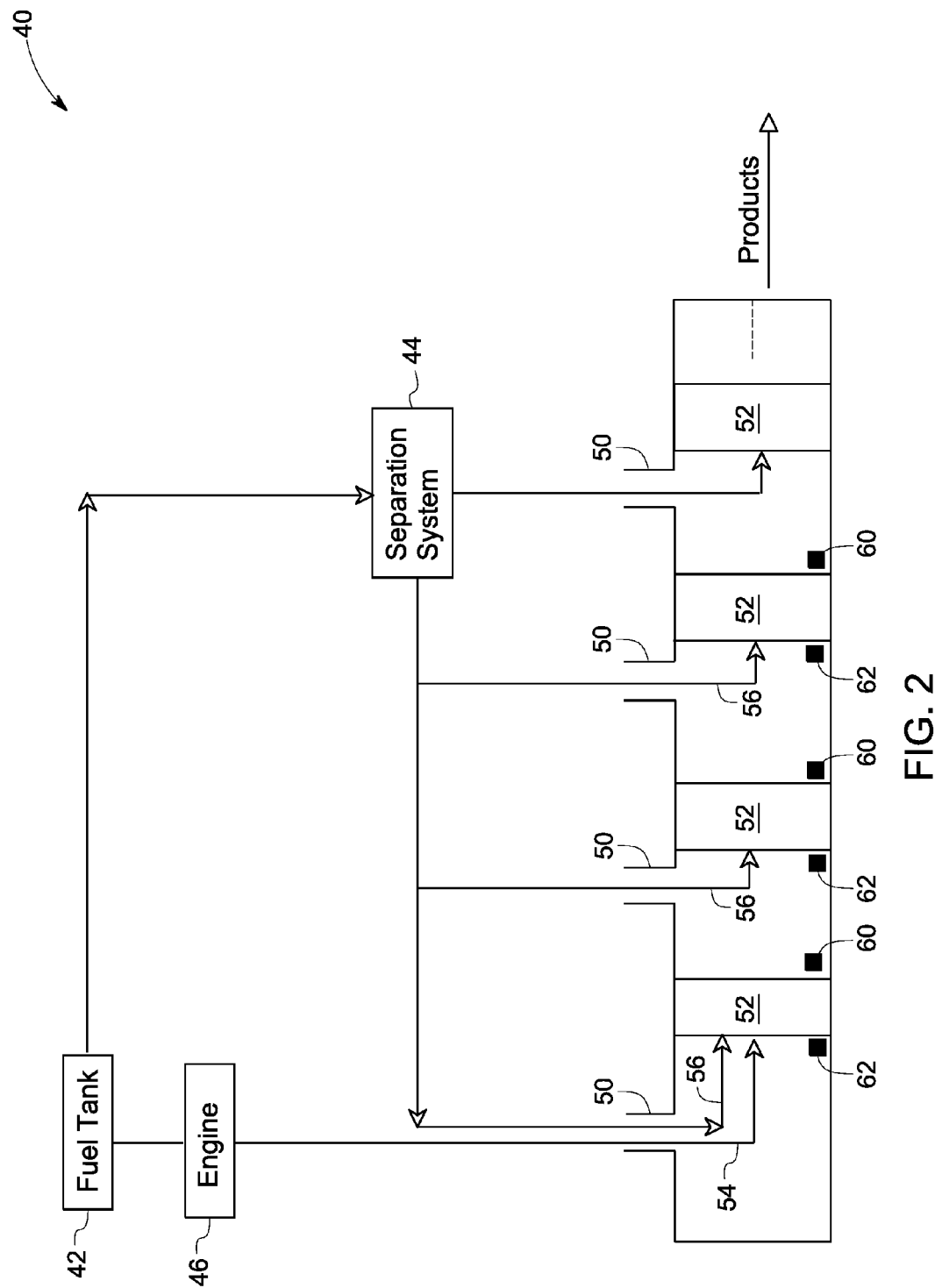

These and other features, aspects, and advantages of the present invention will become better understood when the following detailed description is read with reference to the accompanying drawings in which like characters represent like parts throughout the drawings, wherein:

FIG. 1 is a schematic representation of a system for reducing an exhaust fluid using a catalyst system having a first catalyst and a second catalyst; and FIG. 2 is a schematic representation of a system for reducing an exhaust fluid using a catalyst system having a plurality of catalysts.

DETAILED DESCRIPTION

The present disclosure includes embodiments that relate to systems and methods for reducing nitrogen oxides ($NO_x$) from a stream of an exhaust fluid from an engine of a vehicle or a stationary source. Vehicles may include, for example, locomotives, marine vessels, off-highway vehicles, tractor-trailer rigs, passenger vehicles, and the like. Reducing the nitrogen oxides may result in emissions control from the engine. As used herein, the term "emission control" refers to the ability to affect the compositional make up of an exhaust fluid stream. As exhaust fluid is a mixture of components, the reduction of one component almost invariably increases the presence of another component. For clarity of discussion, the chemical reduction of $NO_x$ is used as a non-limiting example of emission reduction insofar as the concentration of a determined species within the exhaust fluid stream is controlled.

In certain embodiments, a system for reducing nitrogen oxides from an exhaust fluid includes an exhaust source that produces an exhaust fluid having nitrogen oxides, and a hydrocarbon reductant source that provides a hydrocarbon reductant stream. The system further includes a plurality of injectors that are in fluid communication with the hydrocarbon reductant source. The plurality of injectors are positioned to receive a corresponding portion of the hydrocarbon reductant stream from the hydrocarbon reductant source. The injectors expel the corresponding portion of the hydrocarbon reductant stream into the exhaust conduit. The exhaust fluid and the hydrocarbon reductant streams are received by a plurality of catalysts for reducing the amount of nitrogen oxides from the exhaust fluid.

The use of a plurality of injectors requires a smaller amount of the hydrocarbon reductant to be injected to each of the catalysts as opposed to single injector systems where the entire amount of the hydrocarbon reductant needs to be injected to a single catalyst. Advantageously, injecting a smaller amount of the hydrocarbon reductant decreases the rate and amount of deactivation of the catalyst that may result from coke formation. For example, since a smaller amount of the hydrocarbon reductant is injected at the first catalyst, deactivation of the first catalyst due to coke formation at lower temperatures is delayed. Lower deactivation rates increase the selective catalytic reduction (SCR) performance of the catalysts. Typically, hydrogen is used as a co-reductant at low temperatures to overcome the decrease in the SCR performance caused due to coking. Decreased deactivation of the catalysts due to coking reduces the need for hydrogen. Reducing the use of hydrogen results in a lower fuel penalty and also decreases the system complexity by eliminating the need for additional units. In one example, reducing the use of hydrogen results in less frequent use of an on-board reformer, thereby reducing the energy or fuel consumption of the system. The term "on-board" refers to the ability of a vehicle to host the system in its entirety aboard the vehicle. Since excess hydrocarbon reductant, such as diesel, is not converted into coke, there is better utilization of the injected reductant. Also, since urea or ammonia is not used as the reductant, the catalyst blocking observed in the urea- or ammonia-based systems does not take place in the present system.

As used herein, the term "exhaust fluid" refers to a composition having $NO_x$ produced by a combustion process. The exhaust fluid may also include carbon monoxide (CO); carbon dioxide ($CO_2$); molecular nitrogen ($N_2$); water vapor ($H_2O$); molecular oxygen ($O_2$); incompletely combusted fuel may also be present in the exhaust fluid. Also, as used herein, the fuel described as being converted into the various reductants means a fuel being combusted by the engine of the vehicle, locomotive, generator, or the like. As used herein, the term "hydrocarbon" encompasses, but is not limited to, the class of oxygenated hydrocarbons. Non-limiting examples of hydrocarbon reductants may include ethanol, diesel, gasoline, kerosene, jet-fuel, fuel oil, bio-fuels, such as bio-diesel, aliphatic hydrocarbons, aliphatic alcohols, hydrogen gas, and the like, or a combination having at least one of the foregoing hydrocarbon-based fuels. Also, in the following description, an "upstream" direction refers to the direction from which the local flow is coming, while a "downstream" direction refers to the direction in which the local flow is traveling. In the most general sense, flow through the system on a vehicle tends to be from the front of the vehicle to the back, so the "upstream direction" for a system mounted on a vehicle may generally refer to a forward direction, while a "downstream direction" may refer to a rearward direction. The term "fluid communication" is intended to encompass the containment and/or transfer of compressible or incompressible fluids between two or more points in the system. Examples of suitable fluids include gases, liquids, and combinations of gases and liquids.

In one embodiment, the system may use a portion of the fuel for the engine as a reductant to reduce $NO_x$ emissions. The fuel reductants are mixed with the exhaust fluid and facilitate a reduction of $NO_x$ emissions in the presence of a hydrocarbon based selective catalytic reduction (SCR) reactor. The system can be utilized on board in all types of vehicles, such as locomotives, that employ internal combustion powered by hydrocarbon-based fossil fuels. The system can also be utilized in turbines powered by hydrocarbon-based fossil fuels. In a particular embodiment, the system can be utilized in vehicles that employ diesel engines. Advantageously, the system described herein does not necessarily require the need for additional reductant chemicals or the storage equipment required to be on-board therewith.

In one embodiment, one or more temperature sensors and/or one or more nitrogen oxide sensors may be disposed in communication with the plurality of catalysts. For example, the sensors may be in communication with the first catalyst, or the second catalyst, or both the first catalyst and the second catalyst. The use of sensors, such as but not limited to $NO_x$ sensors or temperature sensors, aids in communication and control of the system. The temperature sensors may be disposed downstream of the one or more catalysts. Alternatively or in addition to, $NO_x$ sensors may be disposed upstream of one or more catalysts. One skilled in the art would appreciate where to dispose temperature sensor and $NO_x$ sensors in a system as described herein for reducing $NO_x$. In one example, depending on the sensed parameters, if the SCR conversion decreases with time, the reductant to fuel ratio may be altered in the same or subsequent catalysts (downstream of the catalyst where the parameter is sensed) to increase the conversion efficiency downstream. In this way, losses by coking are at least partly compensated. Where the degree of coking increases beyond a certain specified limit, regeneration of the catalysts may be performed. In one example, the regeneration may be a thermal regeneration. The thermal regeneration rapidly increases the catalyst temperature to "burn off" the coke. After regeneration of the catalyst, the catalyst temperature is returned to normal to resume operation. In one embodiment, computers may be used to aid and control in the flow of fluids in the system.

Referring now to FIG. 1, an example of a system for reducing nitrogen oxides from an exhaust fluid is illustrated. The system 10 can be employed in both stationary applications as well as mobile applications such as vehicle systems (e.g., locomotives, trucks, and the like). The system 10 may include a fuel tank 12, an exhaust source, such as an engine 16, and an exhaust conduit 18. The engine 16 is located downstream of the fuel tank 12 and in fluid communication with the fuel tank 12. The engine 16 is located upstream of and in fluid communication with the exhaust conduit 18. During operation of the engine 16, exhaust fluid flows through the exhaust conduit 18. The exhaust conduit 18 comprises two or more catalysts 24 and 26 disposed in the exhaust conduit 18 at different locations. In the illustrated embodiment, the catalysts 24 and 26 are disposed in series configuration.

The catalysts 24 and 26 may include selective catalytic reduction (SCR) catalysts. In general, SCR catalysts are those catalyst materials that enable the chemical reduction of $NO_x$ species to less harmful constituents such as diatomic nitrogen (i.e., $N_2$). Many of the SCR catalyst materials that promote reduction of $NO_x$ species via reaction with an exhaust fluid and reductants may be suitable for use in embodiments of the system described herein.

In the illustrated embodiment, two catalysts 24 and 26 are disposed in series configuration in the exhaust conduit 18. Although only two catalysts 24 and 26 are illustrated, it should be noted that more than two catalysts may be employed in the system of the invention. The number of catalysts employed in a system may depend on various parameters, such as catalyst composition, catalyst size, catalyst efficiency, system size or exhaust conduit size, number of injectors, and the like. The exhaust fluid is brought in contact with the first catalyst 24 to reduce at least a portion of the nitrogen oxides present in the exhaust fluid. The effluent from the first catalyst 24 is passed to the second catalyst 26, where the effluent comes in contact with the second catalyst 26 to reduce a portion of the remaining $NO_x$ in the effluent.

In certain embodiments, the engine 16 may include a combustion source (not shown). The combustion source may be one or more of a boiler, coal burner, plastics burner, and volatile organic compound burner. The exhaust conduit 18 is operatively coupled to two or more injectors. In the illustrated embodiment, the system 10 employs two injectors 20 and 22. The injectors 20 and 22 are in fluid communication with the hydrocarbon reductant source, which is the fuel tank 12. Although only two injectors 20 and 22 are illustrated, it should be noted that the illustrated embodiment is only an example of the system of the invention. In one embodiment, more than two injectors may be employed in the system of the invention. In one embodiment, each of the injectors may correspond to a catalyst. Each of these injectors may inject the hydrocarbon reductant to the corresponding catalysts (24, 26). In the illustrated embodiment, the fuel tank 12 may also serve as the hydrocarbon reductant source. However, it should be noted that an additional or independent hydrocarbon reductant source may be employed instead of or in addition to the fuel tank 12. The independent hydrocarbon reductant source may include a hydrocarbon reductant that is different from the fuel. In general, a portion of the fuel from the fuel tank 12 may be separated into a plurality of streams depending on the number of injectors employed in the system and each stream is sent to a corresponding injector. In the illustrated embodiment, the fuel is divided into two streams. In one embodiment, the amount of reductant that is transferred to a particular catalyst through the corresponding injector may be calculated based on the data sensed by the temperature sensor and the $NO_x$ sensor associated with that catalyst. In another embodiment, electronic fuel injectors may be used to accurately measure the amount of reductant that is transferred to a particular catalyst. In one example, amount of reductant transferred to each of the catalysts may be varied in a controlled fashion by adjusting the amount of reductant injected by corresponding injectors.

Although not illustrated, in one embodiment, the system 10 may include a separation system. In this embodiment, the fuel tank 12 may be disposed upstream of the separation system. The fuel tank 12, the separation system, and the exhaust conduit 18 may be in fluid communication with one another. In one embodiment, the separation system may be used to divide the reductant stream into a number of sub-streams such that each of the injectors 20 and 22 receive a corresponding sub-stream from the separation system. In one example, the separation system may be designed to produce multiple streams of reductants having different chemical compositions. In another embodiment, the separation system may be used to separate the light hydrocarbons from the heavy hydrocarbons. The light and heavy hydrocarbons may be segregated by using chemical or mechanical methods.

The separating of the fuel stream from the fuel tank 12 into different streams may be done in several ways. In one embodiment, the separation system 10 may separate the lower carbon atom containing reductant from the higher carbon atom containing reductant. The separation between the hydrocarbon reductant streams can be achieved in the separation system based on the difference in volatility observed for the different lengths of carbon chains. The separation system may include various separation devices for carrying out mechanical separation. Non-limiting examples of such devices may include distillation columns (with optional vacuum systems), packed columns, membranes, condensers, centrifuges, or the like that can be used to separate C11 and higher hydrocarbons from low carbon number hydrocarbons. For example, a set of condensers and distillation columns may be ordered with specific temperature profiles tuned to achieve the proper separation for a given hydrocarbon chain length. In one embodiment, the separation system may include only a single separator. In another embodiment, the separation system may include two or more separators. In one embodiment, the separation system may include separators that can mechanically separate one set of hydrocarbon reductants (e.g., long chain hydrocarbons) from another set of hydrocarbon reductants (e.g., short chain hydrocarbons, such as C1-C10).

The different catalysts (24, 26) in the exhaust conduit 18 may be disposed in a suitable configuration to receive the desired hydrocarbons from the injectors (20 and 22). The composition of the catalysts may be determined based on the length of the hydrocarbons that may react with that particular catalyst. For example, the first few catalysts in the exhaust conduit 18 may be configured to react with long chain hydrocarbons, and the subsequent catalysts may be configured to react with short chain hydrocarbons (e.g. C1-C4) that remain in the exhaust fluid or vice versa.

The first and second catalysts 24 and 26 may have the same or different chemical compositions. For example, the composition of the first catalyst 24 may be suitable for reacting with exhaust fluid having higher amounts of $NO_x$, and the second catalyst 26 may be suitable for reacting with the exhaust fluid having lower amounts of $NO_x$. Similarly, the composition of the first catalyst 24 may be suitable for operating at higher temperatures, and the composition of the second catalyst 26 may be suitable for operation at lower temperatures.

The first and the second catalysts 24 and 26 may be similar in size. As used herein, the term "similar" refers to being up to about 10 percent larger or smaller. In one example, the first and the second catalysts 24 and 26 may be of the same size. The catalysts 24 and 26 having the similar size may have same or different chemical compositions. In another embodiment, the first catalyst 24 may be larger in size than the second catalyst 26. The higher surface area of the catalyst results in higher SCR rate of the exhaust fluid. In one example, a size of the first catalyst 24 is about 25 percent to about 75 percent larger than a size of the second catalyst 26. The first catalyst 24 is disposed to receive the exhaust fluid 28 and a first hydrocarbon reductant stream 30 from the first injector 20. The second catalyst 26 is disposed to receive an effluent from the first catalyst 24 and a second hydrocarbon reductant stream 32 from the second injector 22. The ratio of the injected hydrocarbon reductant to exhaust $NO_x$ may increase in the downstream direction in the exhaust conduit 18.

By combining the proper set of SCR catalysts in the proper order (from upstream to downstream), and by injecting the proper portion of hydrocarbon-based reductants at proper locations in the SCR catalyst process, $NO_x$ conversion may be optimized.

The catalysts 24 and 26 may include a catalytic metal disposed on a porous inorganic material. This includes embodiments wherein the catalytic metal is disposed on the surface of a particle of the porous inorganic material, and also includes embodiments where the catalytic metal is disposed within a particle of the porous inorganic material. In one embodiment, the catalytic metal is disposed upon particles of a porous inorganic material such that the catalytic metal may be found both on the surface of particles of the porous inorganic material and within the interior of particles of the porous inorganic material. The catalytic metal may be a single metal species or a mixture of metal species, the only requirement being that the catalytic metal catalyzes the conversion of $NO_x$ into one or more $NO_x$ reduction products, such as nitrogen. In one embodiment, the catalytic metal comprises one or more metals selected from alkali metals, alkaline earth metals, and transition metals. Examples of suitable catalytic metals are silver, platinum, gold, palladium, iron, nickel, cobalt, gallium, indium, ruthenium, rhodium, osmium, iridium, and the like, and a combination comprising at least two of the foregoing metals. In one embodiment, the catalytic metal is silver. In one embodiment, the catalytic metal is selected from among the noble metals. In another embodiment, the catalytic metal is a transition metal. In another embodiment, the catalytic metal is a metal in the lanthanide series such as cerium and samarium. In one embodiment, the catalytic metal is gold, palladium, cobalt, nickel, iron, gallium, indium, zirconium, copper, zinc or a combination comprising at least one of the foregoing metals.

Examples of suitable inorganic oxides useful as the porous inorganic material include silica ($SiO_2$), alumina ($Al_2O_3$), titania ($TiO_2$), zirconia ($ZrO_2$), ceria ($CeO_2$), manganese oxide ($MnO_2$), zinc oxide (ZnO), iron oxides (e.g., FeO, $\beta$—$Fe_2O_3$, $\gamma$—$Fe_2O_3$, $\epsilon$—$Fe_2O_3$, $Fe_3O_4$, and the like), calcium oxide (CaO), manganese oxides other than manganese dioxide, and combinations comprising at least one of the foregoing inorganic oxides. Examples of inorganic carbides useful as the porous inorganic material include silicon carbide (SiC), titanium carbide (TiC), tantalum carbide (TaC), tungsten carbide (WC), hafnium carbide (HfC), and combinations comprising at least one of the foregoing carbides. Examples of suitable nitrides useful as the porous inorganic material include silicon nitrides, titanium nitride, and combinations comprising at least one of the foregoing. Examples of suitable borides useful as the porous inorganic material include lanthanum boride, chromium borides, molybdenum borides, tungsten boride, and the like, and combinations comprising at least one of the foregoing borides. In one embodiment, the porous inorganic material is alumina. In one embodiment, the porous inorganic material is selected from the group consisting of silica, alumina, titania, zirconia, ceria, manganese oxide, zinc oxide, iron oxide, calcium oxide, manganese dioxide, silicon carbide, titanium carbide, tantalum carbide, tungsten carbide, hafnium carbide, silicon nitrides, titanium nitride, lanthanum boride, chromium borides, molybdenum borides, tungsten boride, and combinations comprising at least one of the foregoing. In one embodiment, the first catalyst 24, or the second catalyst 26, or both the first and the second catalysts 24 and 26 may include silver as the catalytic material, and meso-porous alumina as the porous substrate.

The catalytic metal may be uniformly distributed throughout the porous inorganic material. Alternatively, the catalytic metal may form metal particles disposed on the surface of the interior of, or throughout, the porous inorganic material. In one embodiment, the average catalytic metal particle size is about 0.1 nanometer to about 500 nanometers. The catalytic metal may be present in a range from about 0.025 mole percent (mol %) to about 5 mol % based on a total number of moles of the porous inorganic material. The mole percent is determined by dividing the number of moles of catalytic metal by the total number of moles of the metal components in the catalyst, including the catalyst support and any promoting metal present. In one embodiment, the catalytic metal is present in a range from about 5 mol % to about 20 mol % based on a total number of moles of the porous inorganic material. In another embodiment, the catalytic metal is present in a range from about 20 mol % to about 30 mol % based on a total number of moles of the porous inorganic material. In yet another embodiment, the catalytic metal is present in a range from about 30 mol % to about 40 mol % based on a total number of moles of the porous inorganic material. In yet another embodiment, catalytic metal is present in a range from about 40 mol % to about 50 mol % based on a total number of moles of the porous inorganic material.

In one embodiment, the catalyst composition may include a catalytic metal disposed upon a substrate that has pores of a size effective to prohibit hydrocarbon species from poisoning the catalyst composition. The pores generally have an average pore size of about 2 to about 50 nanometers when measured using nitrogen measurements. The catalytic metal, as mentioned previously, may include alkali metals, alkaline earth metals, or transition metals. Examples of suitable catalytic metals are silver, platinum, gold, palladium, iron, nickel, cobalt, gallium, indium, ruthenium, rhodium, osmium, iridium, or a combination comprising at least one of the foregoing metals.

In certain embodiments, the substrate for the catalyst may be meso-porous. As used herein, the term "meso-porous" refers to a material having a pore size in a range from about 2 nm to about 50 nm. The meso-porous substrate of the catalyst may include any of the examples of inorganic materials described previously.

The meso-porous substrate generally has a surface area of about 100 to about 2,000 $m^2$/gm. In one embodiment, the meso-porous substrate has a surface area of about 200 to about 1,000 $m^2$/gm. In another embodiment, the meso-porous substrate has a surface area of about 250 to about 700 $m^2$/gm.

In one example, the first or the second catalysts (24, 26, respectively) may include silver on an alumina support, such as a meso-porous alumina support, that is coated on a monolith support structure. In one example, 3.0 mol % silver may be disposed on mesoporous alumina that is coated on a ceramic monolith support structure. In another embodiment, the SCR catalyst compositions comprise zeolites. The amount of silver in the first (upstream) catalyst 24 may be higher than the amount of silver in the subsequent (downstream) catalysts 26. In another example, where the size of the first catalyst 24 is same as that of the second catalyst 26, the mol % of silver may be higher in the first catalyst 24 as compared to the second catalyst 26.

The meso-porous substrate on which the catalytic metal is disposed may be prepared as a powder. In one embodiment, the meso-porous material is first milled and subsequently the catalytic metal is disposed on the porous material. Suitable milling methods include ball milling, ultrasonic milling, planetary milling, jet milling, and combinations thereof. In one embodiment, the zeolite and the porous material comprising a catalytic metal are ball milled before being incorporated into the formed catalyst.

A variety of fuels may be stored in the fuel tank 12 and used in the system 10. The primary fuel tank supplies fuel to the engine 16. As mentioned above, the engine 16 can be, for example a spark ignition engine or a compression ignition engine. While spark ignition engines are referred to as gasoline engines and compression ignition engines are referred to as diesel engines, it is to be understood that various other types of hydrocarbon based fuels can be employed in the respective internal combustion engines. As mentioned, in one embodiment, the primary hydrocarbon-based fuel is a liquid fuel.

The amount of reductant injected at the subsequent catalysts after the first catalyst may be determined based on the amount of $NO_x$ present in the effluent of the catalyst upstream, and on the temperature of the effluent stream. The $NO_x$ and temperature may be sensed using $NO_x$ and temperature sensors, respectively. The $NO_x$ sensor may measure the concentration of $NO_x$ in the treated exhaust steam exiting the previous catalyst in the series of catalysts. The $NO_x$ sensor may be configured to send a signal representing the $NO_x$ concentration in the treated exhaust fluid to a reductant flow controller. The reductant flow controller may integrate the processed information and determine if the system parameters are indicative of proper control of the treated exhaust fluid, and may further determine the amount of reductant that needs to be supplied to the catalysts downstream. Accordingly, the reductant flow controller can regulate the flow of the reductant stream entering the separation system 44, and the reductant feed streams exiting the separation system 44, based on the signal received from the $NO_x$ sensor and/or the exhaust temperature sensor (such as a thermocouple). In addition to or in place of regulating the flow of the reductant stream at the separation system 44, the flow of the reductant stream may also be regulated at the injector. Such a control system can aid in maintaining the optimum utilization of reductant mixture and catalyst bed usage to improve fuel efficiency and maximize emissions reduction in the exhaust fluid. In one embodiment, the amount of reductant injected at the second catalyst 26 may be determined based on the amount of $NO_x$ present in the effluent of the first catalyst 24, and on the temperature of the effluent stream 34 from the first catalyst 24. The $NO_x$ concentration and exhaust temperature may be sensed using $NO_x$ and temperature sensors 36 and 38, respectively. Sensing of $NO_x$ and temperature may also suggest the amount of coking in the catalysts.

Referring now to FIG. 2, an example of a system for reducing nitrogen oxides from an exhaust fluid is illustrated. The system 40 includes a fuel tank 42, an engine 46, and an exhaust conduit 48. The exhaust fluid from the engine 46 flows through the exhaust conduit 48. Optionally, the system 40 may also include a separation system 44. The plurality of injectors 50 are operatively coupled to the exhaust conduit 48 to inject hydrocarbon reductant 56 to a plurality of catalysts 52 disposed in the exhaust conduit 48. The exhaust conduit 48 also includes $NO_x$ sensor 60 and temperature sensor 64 disposed upstream and downstream, respectively, of the catalysts 52.

The exhaust fluid usually includes air, water, CO, $CO_2$, $NO_x$, $SO_x$, $H_2O$, and may also include other species. Water contained in the exhaust fluid is generally in the form of steam. The hydrocarbon reductant molecules are fed into the exhaust fluid to form a gas mixture, which is then fed through the selective catalytic reduction catalyst. Sufficient oxygen to support the $NO_x$ reduction reaction may already be present in the exhaust fluid. If the oxygen present in the exhaust fluid is not sufficient for the $NO_x$ reduction reaction, additional oxygen gas may also be introduced into the exhaust fluid, such as in the form of air. In some embodiments, the gas mixture includes from about 1 mole percent (mole %) to about 21 mole % of oxygen gas. In some other embodiments, the gas mixture includes from about 1 mole % to about 15 mole % of oxygen gas. To reiterate, the hydrocarbon reductants are particularly effective for reducing $NO_x$ emissions in the exhaust fluid, but are more efficient at reduction when utilized at the optimal temperatures over the optimal catalyst bed compositions.

The systems described herein combine the proper set of catalyst compositions in the proper order in a series configuration, and inject the proper portion of hydrocarbon-based reductants at the proper locations within the exhaust conduit. Moreover, the system may be easily installed for mobile applications and does not require additional chemical storage on-board (such as ammonia or urea found in other $NO_x$ treatment systems). Although described with respect to two catalysts, the system may include three or more catalysts depending on parameters, such as, but not limited to, chemical compositions of the catalyst used, size of the catalysts used, composition of the exhaust fluid, temperature of the exhaust fluid, or the type of reductant used.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for reducing nitrogen oxides from an exhaust fluid, the system comprising:
   an exhaust source configured to produce an exhaust stream comprising nitrogen oxides;
   a hydrocarbon reductant source;
   a first injector in fluid communication with the hydrocarbon reductant source, wherein the first injector is positioned to receive a first hydrocarbon reductant stream from the hydrocarbon reductant source, and to expel the first portion of the hydrocarbon reductant stream;
   a first catalyst disposed to receive the exhaust stream and further disposed to receive the first hydrocarbon reductant stream from the first injector;
   a second injector in fluid communication with the hydrocarbon reductant source, wherein the second injector is positioned to receive a second hydrocarbon reductant stream from the hydrocarbon reductant source, and to expel the second hydrocarbon reductant stream; and
   a second catalyst disposed to receive an effluent from the first catalyst and further disposed to receive the second portion of the hydrocarbon reductant stream from the second injector.

2. The system of claim 1, wherein the first catalyst and the second catalyst comprise the same chemical composition.

3. The system of claim 1, wherein the first catalyst and the second catalyst are similar in size.

4. The system of claim 1, wherein the first catalyst is larger in size than the second catalyst.

5. The system of claim 1, wherein a size of the first catalyst is about 25 percent to about 75 percent larger than a size of the second catalyst.

6. The system of claim 1, wherein the first catalyst and the second catalyst comprise a selective catalytic reduction catalyst.

7. The system of claim 1, wherein the first catalyst, or the second catalyst, or both the first and second catalyst comprise a selective catalytic reduction catalyst selected from the group consisting of silver, gold, gallium, indium, tin, cobalt, nickel, zinc, copper, platinum, palladium, and oxides and alloys thereof.

8. The system of claim 7, wherein the selective catalytic reduction catalyst is disposed on a substrate, wherein the substrate comprises alumina, and the catalyst material comprises silver.

9. The system of claim 1, wherein the catalyst comprises silver disposed on mesoporous alumina.

10. The system of claim 1, wherein the first and second hydrocarbon reductant streams comprise different chemical compositions.

11. The system of claim 1, wherein the first, or second, or both the first and second hydrocarbon reductant streams comprise diesel, biodiesel, kerosene, gasoline, aliphatic hydrocarbons, aliphatic alcohols, or hydrogen gas, or combinations thereof.

12. The system of claim 1, wherein the first and second catalysts are disposed in series configuration.

13. The system of claim 1, further comprising one or more temperature sensors in communication with the first catalyst, or the second catalyst, or both the first catalyst and the second catalyst.

14. The system of claim 1, further comprising one or more nitrogen oxide sensor in communication with the first catalyst, or the second catalyst, or both the first catalyst and the second catalyst.

15. The system of claim 1, wherein the exhaust source comprises a combustion source, wherein the combustion source comprises at least one of a gas turbine, a steam turbine, a boiler, a locomotive, a transportation exhaust system, a diesel exhaust system, coal burner, plastics burner, volatile organic compound burning, a silica plant, or a nitric acid plant.

16. The system of claim 1, further comprising:
 a $NO_x$ sensor configured to measure a concentration of nitrogen oxides in an effluent from the first catalyst, or the second catalyst, or both; and
 a reductant flow controller for controlling the flow of the first hydrocarbon reductant stream, or the second hydrocarbon reductant stream, or both based on the measure concentration of the nitrogen oxides.

17. A system for reducing nitrogen oxides from an exhaust stream, the system comprising:
 an exhaust source configured to produce an exhaust stream comprising nitrogen oxides;
 a hydrocarbon reductant source that provides a hydrocarbon reductant stream;
 a plurality of injectors that are in fluid communication with the hydrocarbon reductant source, wherein one or more of the plurality of injectors are positioned to receive a corresponding portion of the hydrocarbon reductant stream from the hydrocarbon reductant source and to expel the corresponding portion of the hydrocarbon reductant stream; and
 a plurality of catalysts disposed to receive the corresponding portion of the hydrocarbon reductant stream, or the combinations of the exhaust stream and the corresponding portion of the hydrocarbon reductant stream.

18. A method for reducing nitrogen oxides, comprising:
 providing an exhaust stream;
 providing a hydrocarbon reductant stream injecting the exhaust stream and a first portion of the hydrocarbon reductant stream for expelling a combination of at least a portion of the exhaust stream and the first hydrocarbon reductant stream;
 selectively catalytically reducing at least a portion of nitrogen oxides present in the exhaust stream to form a first effluent;
 injecting a second hydrocarbon reductant stream; and
 selectively catalytically reducing at least a portion of nitrogen oxides present in the first effluent by using the second portion of the hydrocarbon reductant stream to form a second effluent.

19. The method of claim 18, wherein the steps of reducing are performed at a temperature in a range from about 100° C. to about 600° C.

20. The method of claim 19, wherein the steps of selectively catalytically reducing comprises:
 contacting at least a portion of the exhaust stream with a first catalyst; and
 contacting at least a portion of the effluent with the second catalyst.

21. The method of claim 20, further comprising:
 determining an amount of nitrogen oxide present in the first effluent, or the second effluent, or both; and
 adjusting reductant to fuel ratio for the first catalyst, or the second catalyst, or both.

\* \* \* \* \*